(No Model.)

W. L. PIKE.
VEHICLE POLE.

No. 497,387.  Patented May 16, 1893.

WITNESSES:
D. May Goodrich.
H. A. Carhart.

INVENTOR
Wm L. Pike
By Smith & Denison
ATTORNEYS.

UNITED STATES PATENT OFFICE.

WILLIAM L. PIKE, OF GROTON, NEW YORK.

VEHICLE-POLE.

SPECIFICATION forming part of Letters Patent No. 497,387, dated May 16, 1893.

Application filed January 21, 1893. Serial No. 459,063. (No model)

*To all whom it may concern:*

Be it known that I, WILLIAM L. PIKE, of Groton, in the county of Tompkins, in the State of New York, have invented new and useful Improvements in Vehicle-Poles, of which the following, taken in connection with the accompanying drawings, is a full, clear, and exact description.

My invention relates to vehicle poles and more particularly to the bracket which connects the inner end of the pole with the cross bar.

My object is to produce a bracket for connecting the inner end of the pole with the cross bar, reinforced so as to protect it against vertical strain; cheap, durable in construction and of great utility.

My invention consists first in constructing a bracket adapted at one end to receive the pole and at its opposite end to receive the cross bar, and reinforced upon its under side; and in the several other novel features of construction and operation hereinafter described and which are specifically set forth in the claims hereto annexed. It is constructed as follows, reference being had to the acccompanying drawings, in which—

Figure 1:
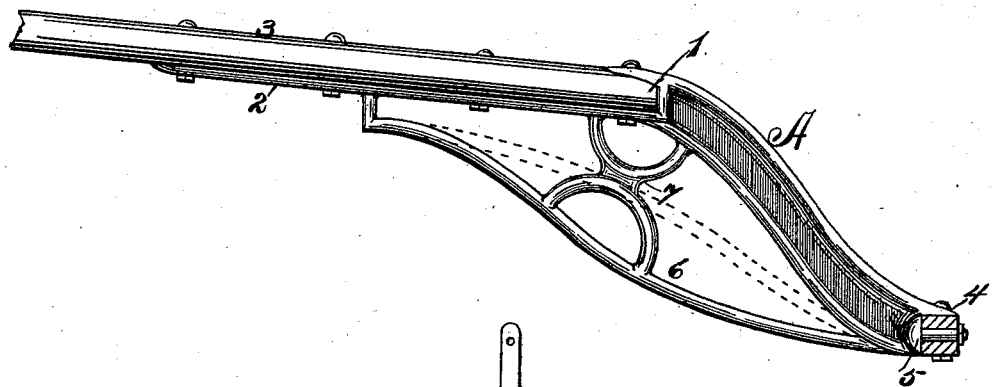
Figure 2:
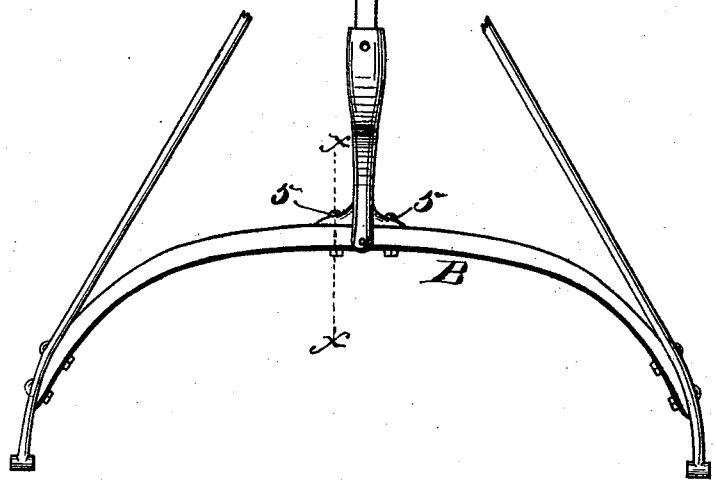

Figure 1, is a side view of the bracket showing the pole secured thereto, at its forward end and showing the cross bar at its rear end in cross section. Fig. 2, is a top plan view of the bracket, showing the cross bar, the pole being removed.

Similar letters and figures of reference indicate corresponding parts.

The bracket comprises an arm —A— which may be bent to any angle or curve desired, and may be of any shape, in cross section, desired. It is preferably, however, constructed I-shaped in cross section, that is, the lateral faces being partially removed for the purpose of making the arm light, without detracting from its strength. The forward end is provided with an opening —1— and a lower plate —2— extends forwardly, provided with openings or other means for securing the pole —3— upon the side plate and into the mouth of the bracket. The rear end of the arm —A— is provided with a strap —4—, and the lateral lugs or arms —5—, all preferably constructed integral with the arm —A—. The lower face of the arm —A—, or it together with the plate —2—, is reinforced either by a narrow web, extending therefrom, or it may be reinforced by a brace —6—, constructed as shown, and provided with intermediate bridges —7—. These are preferably cast integral with the bracket, but I do not limit myself to this construction as it will be evident that a brace without a bridge may be very readily secured by bolts or otherwise, and produce a like result.

The dotted lines in Fig. 1, indicate a change which may be made in the form of the brace —6— and of the bridge —7—.

What I claim as my invention, and desire to secure by Letters Patent, is—

1. The herein described bracket for a vehicle pole, having its forward end provided with means for securing the pole thereto, its rear end bent downward and provided with lateral and vertical lips adapted to receive the cross bar, and a brace extending substantially from end to end and having a bridge interposed between the bracket and brace.

2. The herein described bracket for a vehicle pole, having its forward end provided with means for securing the pole thereto, its rear end declining rearwardly and provided with lateral and vertical lips, and adapted to receive the cross bar and a web formed in the under side of the bracket for the purpose of reinforcing it.

3. The herein described bracket for a vehicle pole having its forward end provided with means for securing the pole thereto, its rear end declining rearwardly and adapted to receive the cross bar and a brace spanning the arc of the bracket and a bridge interposed between the bracket and brace, as set forth.

In witness whereof I have hereunto set my hand this 13th day of January, 1893.

WILLIAM L. PIKE.

In presence of—
C. W. SMITH,
H. P. DENISON.